March 12, 1957     J. H. WILSON     2,785,025
MUD PUMP PISTON
Filed July 6, 1955
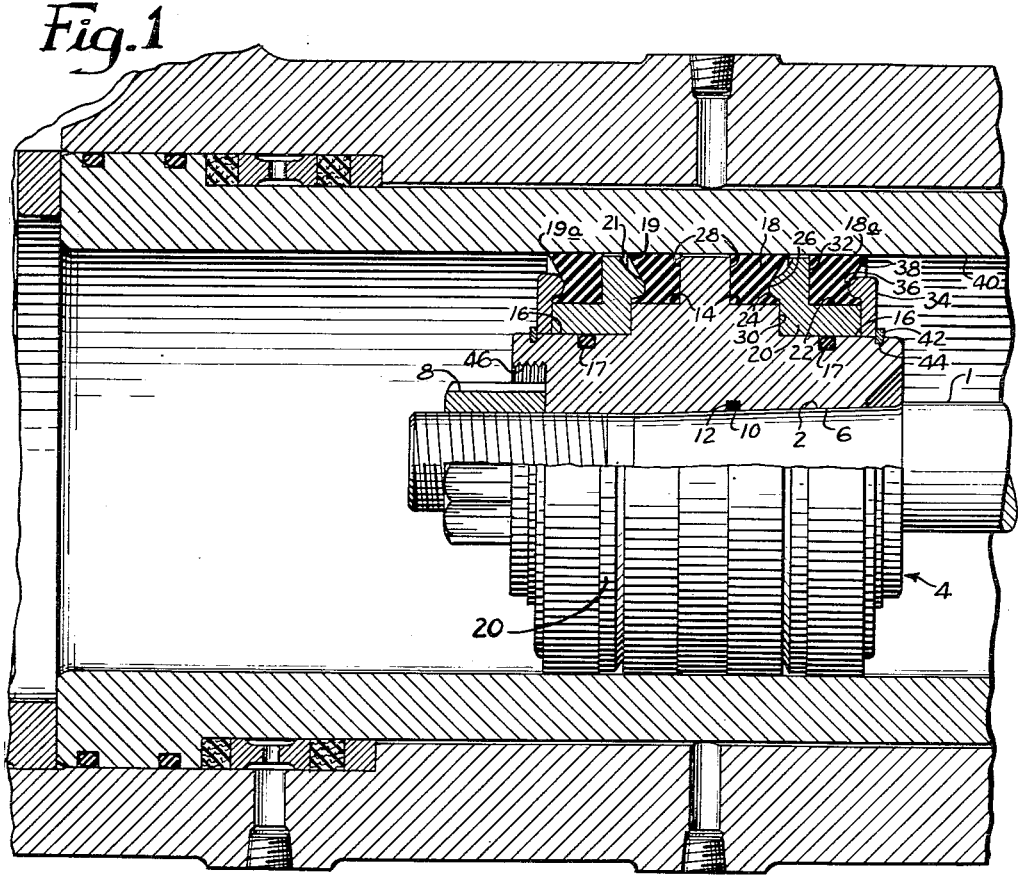
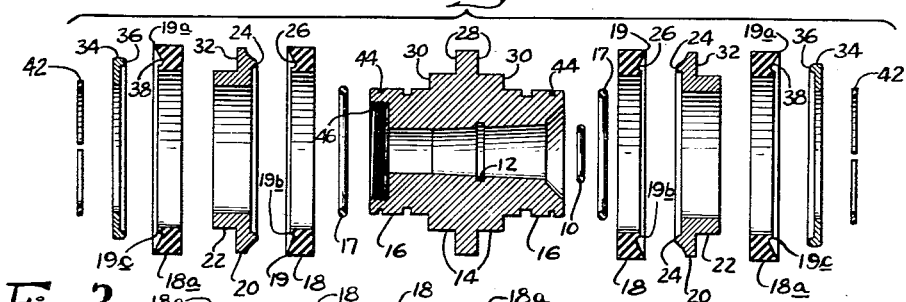
INVENTOR.
JOHN HART WILSON

United States Patent Office 2,785,025
Patented Mar. 12, 1957

2,785,025

MUD PUMP PISTON

John Hart Wilson, Wichita Falls, Tex.

Application July 6, 1955, Serial No. 520,232

9 Claims. (Cl. 309—4)

This invention relates to improvements in pump pistons and more particularly to pump pistons such as are used in mud pumps or slush pumps.

The mud pumps proposed heretofore, for the most part, have involved the use of large pump rings or piston rubbers, which required several pounds of rubber or rubber-like material in the construction thereof, but the rings were nevertheless subject to rapid wear and required frequent replacement, particularly when used with high pressures. The portion of the piston sealing rings subject to greatest wear was the leading edge and the heel of the piston sealing elements, which, when sufficiently worn, would permit the passage of fluid thereby. Because of the excessive wear on the heel of the sealing rubber, it became common practice to put fabric inserts in this portion of the sealing element to prevent excessive expansion with resultant friction and wear.

In the present pump, the sealing rings of the pump pistons are so constructed and fitted onto the piston, as to present a multiplicity of wiping edges or lips, but at the same time the invention provides a piston rubber or sealing ring which is comparatively small in cross sectional area, with respect to the size of pump piston rubbers or rings used heretofore.

This invention is applicable to pistons for use in mechanisms of various types, but it is particularly adapted for use in mud or slush pumps, wherein a fluid seal must be maintained, and wherein the parts are subject to harsh usage, and therefore to pronounced wear.

The present piston employs piston sealing and follower rings which are so designed as to enable the use of a maximum of piston ring capacity and wiping edges, with a minimum of rubber material, with a minimum amount of time being required in removing and replacing the piston sealing rings.

The present structure is primarily designed for use with mud pumps and the like, which are used to pump drilling mud in the drilling of wells in oil fields, where the piston rings wear rapidly and require frequent replacement.

By having the sealing rings constructed with a relatively small cross-section area, as compared to the size of the piston, it is possible to replace these piston sealing rings economically, and to maintain a high degree of operating efficiency at a minimum cost.

An object of this invention is to provide a pump piston which utilizes a plurality of pump piston rubbers or sealing rings which are relatively small in cross-sectional area, yet which present a wearing surface substantially equal to the sealing surface of the piston rubbers or rings now in use on conventional pumps.

Another object of this invention is to provide a plurality of piston sealing rings, each of which sealing rings transfers pressure directly to the metallic supporting member, whereby an individual piston sealing ring has no tendency to compress or to expand the next piston sealing ring.

Still another object of this invention is to provide a pump piston which may be readily removed from the piston rod and replaced thereon without removing the piston rod from the pump.

Yet another object of the invention is to provide a pump piston, the sealing rings or rubbers of which are individually supported on an abutting surface for direct transfer of pressures to the piston.

A still further object of the invention is to provide a plurality of sealing elements for a piston, wherein the pump pressure is divided among the sealing elements so that the pressure on each sealing element is greatly reduced and is below the pressure that would be applied had the pressure been held by a single sealing element, thereby greatly reducing the wear on each element and increasing the service life of the sealing elements.

Still another object of the invention is to provide a pump piston which utilizes piston sealing rings or rubbers of the same size throughout the piston, and which utilizes a follower ring to compress each rubber or ring to the same degree of compression, so as to hold the ring or rubber on the piston, the follower ring for one sealing ring serving as a support for another.

A further object of the invention is to provide a pump piston which has O-ring sealing elements intermediate the pump piston and the follower and support ring so as to prevent leakage between these elements.

Yet another object of the invention is to provide a means for fastening a piston onto a piston rod, wherein the piston rod has the same strength at the piston end as at the juncture of the piston rod with the pony rod.

With these objects in mind, and others which will manifest themselves as the description proceeds, reference is made to the accompanying drawings in which like reference characters designate like parts in the several views thereof, in which:

Figure 1 is an elevational view of the piston embodying the invention, with parts broken away, and with parts shown in section, to bring out the details of construction;

Figure 2 is an exploded, sectional view of the invention; and

Figure 3 is a fragmentary longitudinal sectional view through a modified form of the mud pump piston.

Referring to Figures 1 and 2 of the drawing, the numeral 1 designates a piston rod having a tapered portion 2, on which tapered portion 2 is fitted a piston which is designated generally by the numeral 4. The piston has a tapered portion 6 which is complementary to and engages the tapered portion 2 of the piston rod 1. A nut 8 is screw threaded onto piston rod 1, and a groove 12 is formed within piston 4, which groove 12 has an O-ring 10 fitted therein to form a seal with the piston rod 1.

The body of the piston 4 has external annular step portions 14 and 16 on each end thereof. Piston sealing rings 18 are fitted on each step portion 14, and abut with an annular boss 28, as will be more fully brought out hereinafter. A follower and support ring 20 is fitted on each step portion 16, and an elastomer O-ring 17 is provided intermediate each follower and support ring 20 and the body of the piston, so as to form a fluid tight seal intermediate the piston 4 and the follower and support rings 20. The follower and support rings 20 are preferably of metallic material and each of these rings has an external annular step portion 22 formed on one end thereof to receive a piston sealing ring 18a, which is substantially of the same size as the above mentioned piston rings 18.

The piston sealing rings 18 and 18a are of suitable elastomer material, such as rubber, synthetic rubber or other suitable material.

Each of the follower and support rings 20 has a rounded nose 24 to engage an annular recess 26 formed in an end of each of the piston sealing rings 18. The opposite end of each of the piston sealing rings 18 abuts with a shoulder of the annular boss 28 on piston 4. The respective follower and support rings 20 abut with the respective shoulders 30 on piston 4, when the rings 18 have been compressed to a certain degree, to prevent these rings from moving out of the respective recesses formed between the rounded noses 24 and the shoulders of the boss 28 on the piston. Each of the rings 18a abuts with a shoulder 32 formed on the respective follower and support rings 20, each of which follower and support rings is held in place by an end member or follower ring 34, each of which follower rings 34 has a rounded nose portion 36, similarly formed to the nose portions 24 of the follower and support rings 20. Each rounded nose 36 engages in an annular groove 38 formed on the outer end face of the respective piston sealing rings 18a, so as to hold these rings in place, with sufficient compression to expand the piston sealing rings 18a into close fitting relation with the cylinder wall 40. The end members or follower rings 34 are held in close fitting relation with the follower and support rings 20 and with piston sealing rings 18a by means of snap rings 42, which engage within annular recesses 44 formed in piston 4.

The piston sealing rings 18 and 18a each have an outwardly projecting external lip or sealing edge 19 and 19a respectively, and internal lips or sealing edges 19b and 19c respectively (Figure 2), which internal lips or sealing edges are in close fitting relation with the respective step portions 14 on the piston and 22 on the follower and support rings 20. These internal sealing edges are pressed inward by the respective rounded nose portions 24 and 36 of the follower rings 20 and 34. In this manner, leakage is prevented between the piston sealing rings and the respective step portions.

The outwardly projecting lips or sealing edges 19 and 19a, respectively, are in fluid sealing relation with the wall 40 of the pump cylinder. The lips or sealing edges 19 and 19a are formed at an acute angle of less than ninety degrees, and the sealing edges will flex outward into sealing relation with the cylinder wall, as pressure is applied by movement of the piston 4.

The outer end of the piston 4 has a threaded recess 46 formed therein. When it is desired to disassemble the unit, the nut 8 is removed and a piston puller is screwthreaded into the threaded recess 46, which will enable the piston 4 to be removed from the piston rod 1.

*Assembly*

In assembling the component parts of piston 4, the piston sealing rings 18, which are of elastomer material, are fitted on external annular step portions 14, with the lips or sealing edges 19 and 19b thereof facing outward from the medial portion of the piston. O-rings 17 are then fitted within an annular groove in the piston 4, intermediate the length of the step 16. Each of the follower and support rings 20 is then moved into place, with the rounded noses 24 thereof in contact relation with the respective annular grooves 26 of the piston sealing rings 18. The follower and support rings 20 are so constructed as to provide annular grooves 21 intermediate the outer periphery of the piston sealing rings 18 and the outer periphery of the respective follower and support rings 20. This forms a fluid trap, and upon the increase of pressure within the cylinder 40, will cause an outward movement of the respective lips or sealing edges against the inner wall of the cylinder 40.

With the follower and support rings 20 in place and in sealing relation with the O-rings 17, a piston sealing ring 18a is fitted on each of the external annular surfaces 22 thereof, whereupon, the end members or follower rings 34 are installed to abut with the grooves 38 on the outer faces of the respective piston sealing rings 18a. The follower rings 34 are pressed inward until split snap rings 42 may be interfitted within the respective grooves 44 in piston 4, which snap rings 42 press against follower rings 34 so as to maintain these rings and followers in compressed assembled relation. With the piston sealing rings 18 and 18a and follower and support rings 20 and follower rings 34 assembled onto the piston 4 and held in place by means of the snap rings 42, the piston is ready to be fitted on to the piston rod 1, whereupon, the nut 8 threadably engages piston rod 1 to draw the taper 6 of the piston 4 into tight engagement with the complementary taper 2 of the piston rod 1.

It is to be pointed out that the particular shape of the follower and support rings 20 is such that the pressure exerted upon the face 38 of the piston rings 18a is transmitted to the shoulders 32 of the follower and support rings 20, thence against the shouldered portions 30 of the piston 4, without any of the force being exerted on the piston sealing rings 18. However, any leakage fluid that might pass piston sealing rings 18a will find its way into recesses 21 so as to create a pressure which will move lips or sealing edges 19 outward to cause further sealing action. The pressure exerted on the piston sealing rings 18 will be transmitted to shoulders 28 of piston 4. Therefore, each of the piston rings 18 is entirely individually supported and transmits its pressure directly to the piston 4 and to the pump rod 1.

A modified form of the invention is shown in Figure 3, and is substantially in accordance with the form of the invention as shown in Figures 1 and 2, except for the manner of seating the bore of the piston on the piston rod. This modified form of the device enables the use of a piston rod 51 which has a boss 52 formed thereon, which boss is conical, as indicated at 53, to receive a piston 4a thereon, so that a face 54 will complementarily seat against face 52, when the piston is in place on the piston rod 51. The piston rod 51 is of uniform diameter for more than half the lineal distance on which the piston 4a seats, as indicated at 55. A portion 56, of reduced diameter, provides clearance between the piston 4a and the piston rod 51.

The connecting joint between the piston 4a and piston rod 51 consists of, first, a threaded portion 64 on the piston rod 51, which threaded portion is of substantially the same diameter as the threaded portion (not shown) on the other end of the rod, which joins the piston rod 51 to the pony rod (not shown). A tapered portion 65 is provided between the top of threads 64 and the cylindrical portion 56 of the piston rod 51. The body of the piston 4a is bored, as indicated at 58, to a diameter which is larger than the diameter of the reduced portion 56 of the rod 51. This provides a clearance space between the rod 51 and the body of the piston 4a, in which rust may accumulate or other gritty particles collect without locking the piston 4a on the rod 51 when the piston is telescoped over the rod, substantially as shown in Figure 3.

The cylindrical portion 56 then has a transitional tapered portion 55a which connects with a cylindrical portion 55, which portion 55 is of slightly larger diameter. This slightly larger diameter portion fits snugly within the bore 58 in the piston, only slightly larger than the piston rod 55, which bore has an annular groove 59 formed therein to accommodate an O-ring 60 which provides a fluid tight seal between the piston 4a and the piston rod 51. The portion, which is of slightly larger diameter, on the rod 55 then extends to a conical shoulder 53 on the rod 51, which interfits with a conical face 54 on the end of the piston 4a to provide a thrust shoulder to force piston 4a through the cylinder in one direction.

On the opposite end of the piston 4a a conical face 61 similar to the conical face 54, interfits with a conical face 62 on the nut 63, which nut is threaded on the end of the piston rod to provide a thrust shoulder to force the piston through the cylinder in the opposite direction. Between the close fitting portion adjacent the O-ring 60 and the conical shoulder 53, the body of the piston 4a is counterbored, as indicated at 57, to be substantially larger than the diameter of the rod 55, which provides clearance space in which rust may form or gritty particles accumulate, without locking the piston 4a on the rod 51.

The counterbore 57 is less than one-half the length of the piston 4a and since the reduced portion 56 is less than one-half the length of the seating area of the piston, this provides a close fit between the piston 4a and the cylindrical portion 55 for a limited contact area, and while the O-ring 50 within annular groove 59 is intermediate the contact area, a relatively short longitudinal pull on piston 4a will disengage the seating area of the bore 58 on the piston from the corresponding seating area of the cylindrical portion 55 of the rod. This is of particular advantage for use with mud pump pistons, since the foreign matter often makes the removal of the pistons from piston rods quite difficult.

When the nut 63 draws the conical faces 53—54 and 61—62 into tight fitting relation, and with the O-ring 60 seating in annular groove 59, and with the O-ring sealing between the piston and the piston rod, the fluid within the pump is sealed against by-passing the piston 4a, as the sealing rings 18 and 18a seal the piston 4a against the cylinder wall 40 of the pump piston.

Having thus described the invention, what is claimed as new and desired to be secured by Letters Patent is:

1. The combination with a piston body having an annular boss formed intermediate the length thereof, at least two reduced annular step portions being formed on each side of said annular boss, of a plurality of resilient, elastomer piston sealing rings, and a follower and support ring, having a sleeve thereon, on each side of said boss, each of said sleeves bearing radially against the outer step portion on each side of said boss, each of said elastomer piston sealing rings having a substantially plane face on one end and having a concave face on the opposite end, which concave face has outer and inner circumferential sealing edges, said follower and support rings being adapted to abut with the shoulders of said boss and with the concave face of the respective elastomer piston sealing rings, the support sleeve of each of said follower and support rings extending outwardly to receive piston sealing rings, which piston sealing rings are similar to said first mentioned piston sealing rings, thereon, retainer rings, each having an inwardly facing annular boss thereon, fitted on each end of said piston body, the boss of each of said retainer rings being adapted to engage the concave face of one of said second mentioned piston sealing rings, and means for securing said retainer rings against relative longitudinal movement with respect to said piston body.

2. In a mud pump piston having a bore formed therein, an annular boss formed medially of the length of said piston, at least two reduced annular step portions formed on each side of said annular boss, the annular step portions immediately adjacent said annular boss being adapted to receive piston sealing rings thereon, each of which piston sealing rings is formed to have one plane face and one concave end face, said second annular step portions having follower and support rings fitted thereon in fluid tight relation therewith, the inner end of each of said follower and support ring extending upward and forming an inwardly facing annular boss, a portion of said inner end of each said follower and support ring being adapted to abut with one of said first named step portion so as to transmit the pressure from said second mentioned piston sealing rings directly to the body portion of said piston, the other side of each said follower and support rings having an annular reduced portion which is substantially of the same diameter as said first named reduced annular step portion, which annular reduced step portion of each said follower and support ring is adapted to receive a piston sealing ring thereon, which piston sealing rings are substantially the same size and conformation as said first mentioned piston sealing rings, a retainer follower ring on each of said second reduced portions of said piston, which retainer follower rings each has a convex face portion and a plane face portion on one end, said retainer follower rings being adapted to abut with said follower and support rings and said second named piston sealing rings so as to bindingly engage said piston sealing rings and said follower and support rings with said piston, and further retaining means to retain said retainer follower rings against longitudinal movement relative to said piston.

3. In a mud pump piston assembly, a piston body having an annular boss intermediate the ends thereof, resilient annular piston sealing rings fitted on said piston body, one on each side of said annular boss and in abutting relation therewith, said piston body having annular reduced portions, one near the outer end of each of said resilient piston sealing rings, an annular follower-support ring fitted on each of said reduced portions of said piston body, the follower portion of each of said rings being in abutting relation with a shoulder formed on said piston body by said reduced portions and also being in abutting relation with the outer end portion of said annular, resilient piston sealing rings, the support ring portion of each being an annular supporting surface for a sealing ring, a sealing ring fitted on each supporting surface of said follower-support ring, which sealing rings are substantially identical in size and shape with said first mentioned sealing rings, and further follower rings, one fitted on each of said reduced portions of said piston body and in abutting relation with said last mentioned piston sealing rings and said follower-support rings, and means for retaining said last mentioned follower rings on said piston.

4. In a mud pump piston having a bore formed therein, an annular boss formed medially of the length of said piston, at least two reduced annular step portions formed on each side of said annular boss, the annular reduced step portions formed on each side of said annular boss each carrying a piston sealing ring having one plane end face and one concave end face thereon, each said second annular step portion having a follower and support ring mounted thereon in close fitting relation with said annular step portion, one end of each of the follower and support rings extending outwardly and forming an annular boss with a convex face on one side thereof, the other side of each of said follower and support rings having an annular reduced step portion which is substantially of the same diameter as said first annular step portion, which annular reduced step portion of each said follower and support ring is adapted to receive a piston sealing ring of substantially the same size as the first mentioned piston sealing ring, the inner periphery of said follower and support rings being adapted to abut with the respective first step portions so as to transmit the pressure from said second piston sealing rings directly to the body portion of said piston, a retainer ring on each said second annular reduced portion, each retainer ring having a convex face portion and a plane face portion on one end, which retainer rings are adapted to abut with said follower and support rings and said piston sealing rings so as to bindingly engage said piston sealing rings and said follower and support rings with said piston, and further retainer ring means to retain said retainer rings against longitudinal movement relative to said piston.

5. The device substantially as set forth in claim 1, wherein an elastomer O-ring sealing element is positioned intermediate said follower and support ring and the body of said piston.

6. The device substantially as set forth in claim 1, wherein said piston has a bore formed therein, said piston being counterbored less than one-half its length, a piston rod having a reduced diameter portion of less than one-half the length of said piston, said piston and said piston rod having a coexfensive length of close fitting cylindrical surfaces, one of said surfaces having a groove formed therein to receive an O-ring, an O-ring fitted within said groove in sealing relation between said piston and said piston rod, an annular boss on said piston rod, which boss has a conical face, said piston having a complementary face in each end of said bore, threads on said rod, a screw threaded nut having a conical face, which nut is screw threaded to engage the threaded portion of said rod so as to cause the conical face of said nut to engage a conical face on said piston and to cause the conical face on the other end of said piston to engage the conical face on said piston rod boss.

7. In a mud pump piston a piston body portion having a medial annular boss of substantially the diameter of the pump cylinder to be fitted, first and second annular portions of successively smaller diameters at either side of said medial boss, a piston sealing ring mounted on each said first annular portion, a follower and support ring mounted on each said second annular portion and engaging one of said sealing rings, a second sealing ring mounted on each said follower and support ring, a follower ring mounted on each said second annular portion outside of said follower and support ring and engaging the latter and said second sealing ring, and means for restraining longitudinal movements of said follower rings.

8. The combination with a piston body having an annular boss formed intermediate the length thereof, at least two reduced annular step portions being formed on each side of said annular boss, a plurality of resilient, elastomer piston sealing rings, and a follower and support ring, having a sleeve thereon, on each side of said boss, each of said sleeves bearing radially against the outer step portion on each side of said boss, said follower and support rings being adapted to abut with the shoulders of said boss and with the face of the respective elastomer piston sealing rings, the support sleeve of each of said follower and support rings extending outwardly to receive piston sealing rings, which piston sealing rings are similar to said first mentioned sealing rings thereon, retainer rings, fitted on each end of said piston body, and means for securing said retainer rings against relative longitudinal movement with respect to said piston body.

9. The device as defined in claim 7, wherein the outer end of said piston has a threaded connection thereon, which threaded connection is engageable by a piston puller.

References Cited in the file of this patent
UNITED STATES PATENTS

| | | |
|---|---|---|
| 1,545,936 | Black | July 14, 1925 |
| 2,267,882 | Wilson | Dec. 30, 1941 |
| 2,549,818 | Joy | Apr. 24, 1951 |
| 2,656,229 | Stillwagon | Oct. 20, 1953 |